Figure 1:
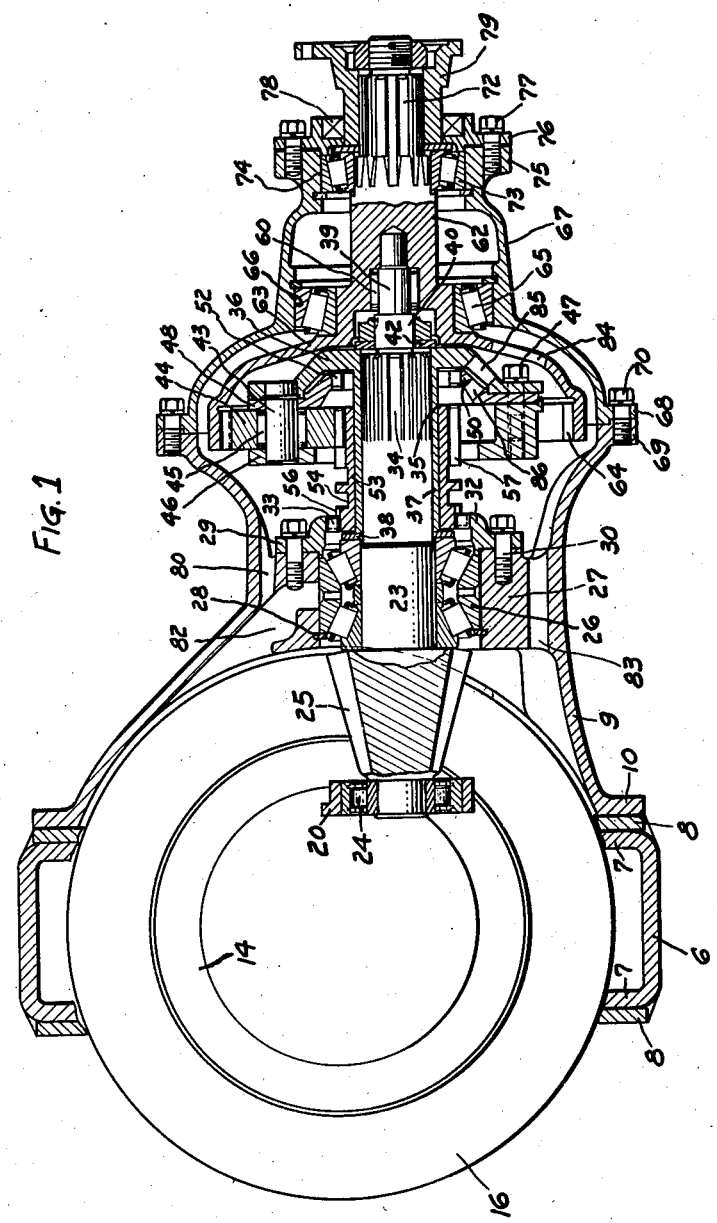

Feb. 23, 1943.  D. D. ORMSBY  2,312,263
TWO-SPEED AXLE
Filed Dec. 23, 1940  2 Sheets-Sheet 1

INVENTOR
DONALD D. ORMSBY
BY Walter E. Schirmer
ATTORNEY.

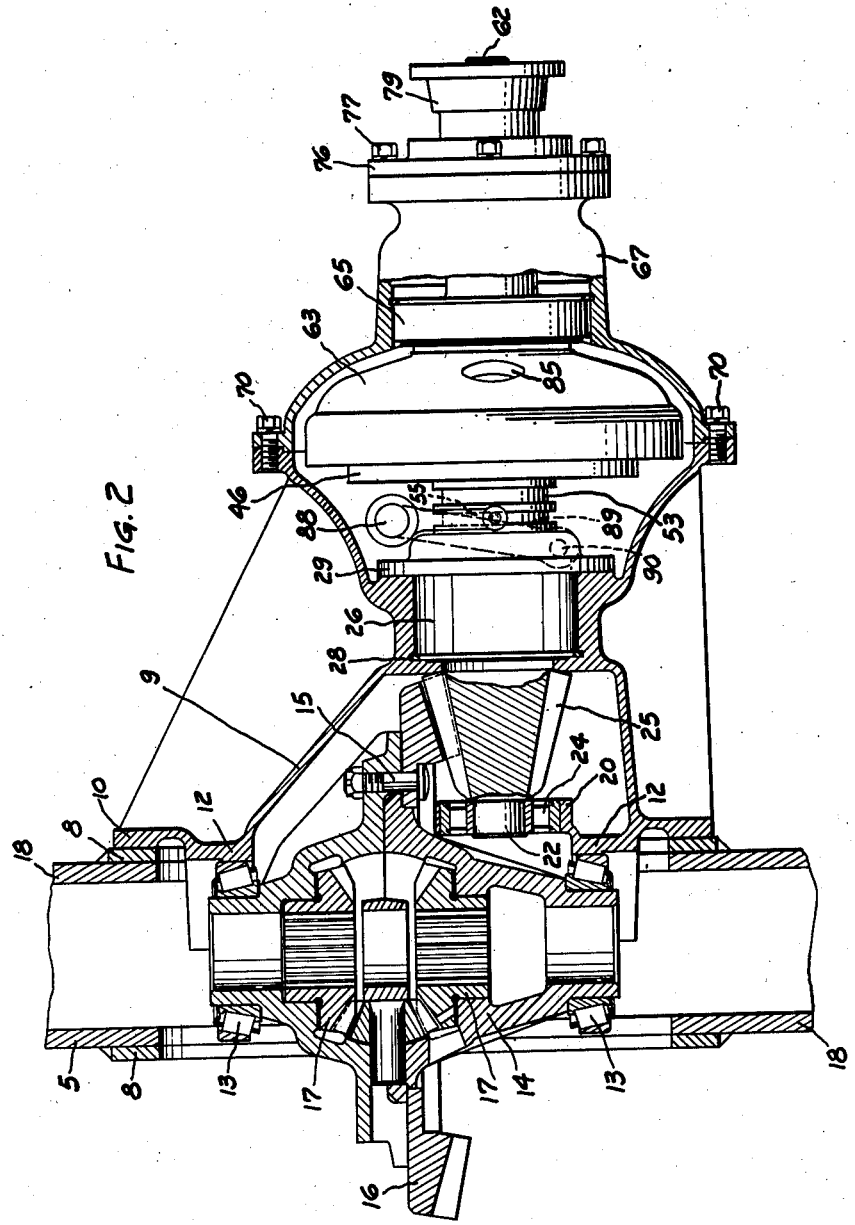

Patented Feb. 23, 1943

2,312,263

UNITED STATES PATENT OFFICE 2,312,263

TWO-SPEED AXLE

Donald D. Ormsby, Buchanan, Mich., assignor to Clark Equipment Company, Buchanan, Mich., a corporation of Michigan Application December 23, 1940, Serial No. 371,267

4 Claims. (Cl. 74—314)

This invention relates to two-speed axles, and more particularly is concerned with a two-speed axle for use in connection with trucks, busses and similar vehicles in which a reduction is desired in the ratio between the propeller shaft and the axle under certain load conditions.

The primary object of the present invention is to provide a two-speed axle in which, by the use of hypoid gearing in conjunction with a primary reduction, the axle can be driven at two different reduced speeds from the propeller shaft. By the use of a hypoid gear drive to the differential, it is possible to shorten up the over-hang of the differential carrier and associated reduction, while at the same time maintaining the vertical limits of this assembly within the projected vehicle limits of the rear axle housing so as to sacrifice no road clearance or body clearance by the use of this construction.

Another object of the present invention is to provide a two-speed axle employing a stub shaft driven from the propeller shaft which has journalled in the end thereof the pinion shaft that drives the differential. Between the stub shaft and the pinion shaft there is provided a planetary gear system which can be used as an underdrive to the pinion shaft or can be coupled to provide a direct drive thereto from the stub shaft. The planet spider which carries the pinion gears is splined onto the pinion shaft, and preferably has an extended hub portion upon which is mounted a sun gear, the sun gear being axially shiftable from a position in which it is locked against rotation to provide the underdrive into a position in which it serves to lock the pinions against rotation relative to the planet spider, thereby providing a direct coupling between the stub shaft and the pinion shaft.

Another advantage attained by the present invention is the reduction in over-hang of this type of construction as compared to conventional types of two-speed axles now on the market with an attendant decrease in weight and bulk. This also eliminates the use of an extra lay shaft which is commonly employed for two speed axles, or the use of intricate gear arrangements and shifting mechanism carried by the differential itself. In fact, with the present construction, the differential may be of the standard or conventional type, and is driven in the conventional manner from a pinion gear, although, by the use of the hypoid ring gear on the differential case and the hypoid driving pinion it is possible to shorten up the over-hang to an appreciably greater extent than is possible if a conventional spiral bevel gear drive is provided.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a vertical sectional view of the two-speed axle embodying the present invention; and Figure 2 is a plan view, partly in section, of the structure shown in Figure 1.

Considering the drawings in detail, I have provided an axle housing indicated generally at 5, which preferably is of the banjo type having the circular banjo portion 6 provided with the radially inturned flanges 7 to which are mounted the reinforcing rings 8 which may be welded or otherwise suitably secured thereto. To the rear ring 8, there is secured the conventional back cover plate (not shown), while to the forward ring 8 there is bolted the differential carrier indicated generally at 9, which carrier has a flange portion 10 abutting against the face of the ring 8 and bolted or otherwise suitably secured thereto. The carrier 9 is provided with journal portions 12 carrying suitable bearings 13 for journalling the differential case 14 therein. This differential case may be of the type shown in the patent to Vanderberg, No. 2,219,025, issued October 22, 1940, in which a two-piece case is provided which is bolted together by a series of circumferentially spaced bolts 15, which also serve to secure the ring gear 16 thereto. The differential case 14 encloses the two side gears 17 which are internally splined to receive the axle shafts extending outwardly through the hub portions of the case to the wheels through the axle housing arms 18.

The carrier 9 is also provided with a journal member 20 forming a straddle bearing for the stud end 22 of a pinion shaft indicated generally at 23, the stud end being supported in the roller bearing assembly 24 carried by the journal 20.

The pinion shaft 23 is provided with the hypoid pinion portion 25 having driving engagement with the hypoid ring gear 16, and is preferably mounted by means of the double tapered bearing assembly 26 in the bore 27 of the carrier 9. The bearing assembly 26 has the inner race thereof bearing against the back edge of the pinion portion 25 of the shaft, with the outer race held in position by means of a snap ring 28. The opposite end of the inner race is locked against axial movement by means of a plate member 29 bolted by means of the studs 30 to the bore forming portion 27 of the housing or carrier and provided with a laterally offset portion 32 having internal gear teeth 33 formed therein.

The forward end of the pinion shaft 23 is provided with splines 34 which are adapted to receive the internally splined portion 35 of a planet spider 36, this spider having the extended hub 37 encircling the pinion shaft and bearing at its rear end against the thrust member 38 for locking the inner race of the bearing assembly 26 against movement. At its opposite end the shaft 23 is provided with an extended stud portion 39 and a shoulder portion 40 suitably threaded to bear against a thrust washer 42 which holds the spider 36 against axial movement.

The spider 36 is provided with the pins 43 upon which are mounted the planet pinions 44 by means of the roller bearings 45. The opposite ends of the pins 43 are retained in a plate member 46 which is secured to the spider by means of the studs 47. Secured between the member 46 and the spider 36 is a plate 48 which has a laterally offset portion 50 provided with the internal gear teeth 52 disposed in laterally offset position with respect to the pinion gears 44.

Mounted upon the hub portion 37 of the spider 36 and journalled for rotation thereon and for axial shifting movement therealong is a sun gear member 53 having a collar portion 54 adapted to receive the shifting yoke 55 shown in Figure 2, and also provided at its rear end with an external brake tooth portion 56 adapted, when the sun gear 53 is in the position shown in Figure 1, to engage with the gear teeth 33 for locking the sun gear against rotation by meshing engagement with the plate member 29 secured to the carrier.

The sun gear 53 is also provided with the axially lengthened sun gear teeth 57 at the forward end thereof which are of sufficient axial length as to be in constant meshing engagement with the pinion gears 44. Upon axial shifting movement of the sun gear 53 to the right, as viewed in Figure 1, the teeth 57 are adapted to move into meshing engagement with the teeth 52, thereby locking the sun gear for conjoint rotation with the spider 36, and at the same time, locking the pinion gears 44 against rotation due to the fact that the teeth 57 are of sufficient axial extent as to be retained in engagement with the pinions 44 even with the sun gear shifted to its extreme right hand position.

The stud end 39 of the pinion shaft 23 is journalled by the bearings 60 in the recessed end of a stub shaft 62, which shaft is provided with the radially enlarged portion 63 terminating at its periphery in the internal ring gear portion 64, which has driving engagement with the pinions 44, it being understood that three or more such pinions are provided. The shaft 62 is suitably supported adjacent the ring gear end thereof by means of the tapered roller bearing assembly 65 seated in a bore 66 of a housing 67 having a peripheral flange 68 piloted in and secured to the flange 69 of the carrier 9 by means of the studs 70. Adjacent its forward end the shaft 62 is splined as indicated at 72, and is supported by means of the tapered roller bearing assembly 73 in a reduced bore 74 of the housing 67. The housing 67 terminates in a radially flanged portion 75 in which is piloted a bearing retaining cap 76 secured thereto by means of the studs 77 and having an outwardly opening recess in which is disposed a lubricant seal 78. Mounted on the splined end 72 of the shaft 62 is the companion flange 79 of a universal joint assembly by means of which the shaft 62 is connected to the propeller shaft of the vehicle.

It is to be understood that the axle housing 5 may have the spring pads thereon so arranged relative to the housing that it will be cocked with the top of the banjo portion 6 thereof slightly rearwardly of a vertical line through the axis of the differential. This results in producing an upward inclination of the axis of the shafts 23 and 62, thereby reducing the angularity of the universal joint assembly 79.

For lubrication of the planetary gear system, the carrier 9 is provided with the longitudinally extending opening 80, whereby lubricant may pass therethrough into the differential gearing. In order to lubricate the bearing assembly 26, the carrier is also provided with the radially inwardly extending opening 82 leading to the center of the gearing assembly and also communicating with the differential housing so that lubricant thrown upwardly by the ring gear 16 is caught within the recess 82 and is directed thereby into the bearing assembly 26 and through the passage 80 to the planetary gear assembly. A second longitudinally extending bore 83 is provided adjacent the base of the partition 27 to provide for return of lubricant from the planetary gear system back into the differential housing.

The flange portion 63 of the shaft 62 is provided with openings 84 for the purpose of admitting lubricant to the interior of the planetary gear assembly, these openings cooperating with openings 85 and 86 formed in the planetary spider 36 and the plate 48.

It will be apparent that by using hypoid gears 16 and 25 that the rear end of the shaft 23 can be located closer to the axis of the differential 14, consequently reducing the overall length of the carrier 9. In addition, by the use of a planetary gear assembly, the housing 67 is of relatively short length so that the overhanging of the combined housings 9 and 67 is not materially greater than the conventional overhang of a single speed axle.

It will also be noted that the peripheral limits of the flanges 68 and 69 are well within the projected vertical limits of the banjo housing 6 so that the use of this axle assembly will not result in any sacrifice of either road clearance or body clearance.

The operation of the mechanism is provided by means of the shifting yoke 65 carried by a shaft 88 mounted in the carrier 9 for rotation, and having a projecting arm indicated diagrammatically at 89, which has the end 90 thereof connected to longitudinally extending control lever reaching to the driver's compartment. Thus, the driver from a remote position is able to shift the sun gear 53 from one to the other of its selected positions to provide either an under-drive or a reduction, as when in the position shown in Figure 1, or to provide a direct coupling between the shaft 62 and shaft 23 when shifted into a position engaging the teeth 52.

It is therefore believed that the present two-speed axle presents numerous advantages over two-speed axles of previous designs, and is of materially less weight and size than required for the conventional type of two-speed axle, while at the same time retaining the advantages of using a differential which is not of a special type.

I am aware that various changes may be made in certain details of the present construction, and therefore do not intend to be limited except as defined by the scope and spirit of the appended claims.

I claim:

1. In a two speed axle, a differential case having a hypoid ring gear, a hypoid pinion shaft having driving engagement with said ring gear, a drive shaft having an internal ring gear at the end thereof, said pinion shaft being journalled in the end of said drive shaft, a planet spider carried by said pinion shaft and having an extended hub portion, planet gears carried by said spider and driven from said internal ring gear, a sun gear slidably mounted on said extension in engagement with said planet gears and adapted to be locked against rotation in one position, and means operable upon shifting of said sun gear into a second position for locking said sun gear and planet spider against relative rotation while retaining said sun gear and pinion gears in meshing engagement.

2. The combination, with a pinion shaft for driving a differential of an axle, a stub shaft having means in the end thereof journalling the adjacent end of said pinion shaft, an internal ring gear on said stub shaft, planet pinions driven thereby, a planet spider carrying said pinions and having an extended hub splined on said pinion shaft, a sun gear journalled on said hub for axial shifting movement, means at one end of said sun gear engageable to lock said sun gear against rotation when in meshing engagement with said pinions, and means operable upon axial shifting of said sun gear for releasing said locking means and to lock said sun gear and spider for conjoint rotation, said sun gear teeth being of a length such as to maintain meshing engagement with said pinions throughout said shifting.

3. In combination, a rear axle housing, a differential carrier secured thereto and having a differential case journalled thereby in said housing, a hypoid ring gear on said case, a hypoid pinion shaft journalled in said housing, a bell shaped housing secured to the forward end of said carrier, a stub shaft journalled therein, a planetary gear system between said shafts including an axially shiftable sun gear, and means in said carrier for locking said sun gear against rotation in one shifted position thereof, said pinion shaft and said stub shaft lying in a plane below a horizontal plane extending through the axis of said differential, and said carrier and bell housing having no portion projecting below the projected vertical limits of said rear axle housing.

4. In combination, a banjo type rear axle housing, a differential carrier bolted thereto having a differential case provided with a hypoid ring gear, a hypoid pinion shaft journalled in said housing, a bell-shaped housing piloted on the forward end of said carrier and having a stub shaft journalled therein in axial alinement with said pinion shaft, and a planetary gear system coupling said shafts together including an axially shiftable sun gear, said carrier and bell-shaped housing being of a size such as to lie between parallel planes through the top and bottom of said banjo housing, with said pinion shaft and stub shaft lying in a plane below the midplane between said parallel planes.

DONALD D. ORMSBY.